United States Patent Office 3,736,269

Patented May 29, 1973

3,736,269

SOLID COMPOUND OF RHODIUM AND TELLURIUM AND MANUFACTURING PROCESS THEREFOR

Louis Degueldre and Yves Gobillon, Brussels, Lucien, Clerbois, Vilvoorde, and Louis Bourgeois, Brussels, Belgium, assignors to Solvay & Cie, Brussels, Belgium No Drawing. Filed July 29, 1971, Ser. No. 167,516
Claims priority, application Belgium, July 29, 1970, 61,434
Int. Cl. H01b *1/08;* C01b *19/00;* C01g *55/00*
U.S. Cl. 252—518 3 Claims

ABSTRACT OF THE DISCLOSURE $Rh_2TeO_6$ crystallized in the tetragonal system under the trirutile form, the parameters $a_o$ and $c_o$ being 4.54 and 9.245 A., respectively, having an electrical conductivity of $10^{-4}$ (ohm·cm.)$^{-1}$ and an energy gap of 0.04 ev.

BACKGROUND OF THE INVENTION

The present invention relates to a new oxygen-containing compound of rhodium and tellurium, $Rh_2TeO_6$, and to a manufacturing process therefor.

SUMMARY OF THE INVENTION

The present invention concerns a compound $Rh_2TeO_6$.

DESCRIPTION OF THE PREFERRED EMBODIMENTS

The new compound was prepared from powered $Rh_2O_3$ and $TeO_2$, which were mixed in equimolecular quantities, then comminuted and pelletized.

The starting oxide $Rh_2O_3$ was obtained by pyrolysis at 500° C. of pure rhodium nitrate supplied by Fluka, whereas the $TeO_2$ was a pure product containing 99% $TeO_2$ also from Fluka.

In an example, 1.60 g. of pure $TeO_2$ and 2.54 g. of pure $Rh_2O_3$ were mixed together. Then during a period of 1 hour, the mixture was comminuted dry in a steel ball mill lined with tungsten carbide and provided with tungsten carbide balls in order to obtain a well homogenized mixture which was then pelletized in the shape of a disc at room temperature under a pressure of 1000 kg./cm.$^2$ (6.35 tons per square inch) and heated in air at 750° C. for 24 hours.

The resultant black porous disc of $Rh_2TeO_6$ was then comminuted in the aforesaid ball mill until all particles had a particle size of one micron or below.

An X-ray crystallographic analysis carried out on the thus obtained powder showed that the $Rh_2TeO_6$ crystallizes in the tetragonal system and belongs to the trirutile type. The unit cell has the following parameters:

$$a_o = 4.54 \text{ A. and } c_o = 9.245 \text{ A.}$$

The unit cell contains two molecules of $Rh_2TeO_6$.

The intensities of the lines and the observed interplanar spacings determined in the X-ray crystallographic analysis are given in the following table.

| Intensity | Miller indices h | k | l | Interplanar spacing, d (A.), $Rh_2TeO_6$ |
|---|---|---|---|---|
| ff | 0 | 0 | 2 | |
| ff | 1 | 0 | 1 | |
| TF | 1 | 1 | 0 | 3.21 |
| F | 1 | 0 | 3 | 2.55 |
| mf | 2 | 0 | 0 | 2.27 |
| f | 1 | 1 | 3 | 2.22 |
| f | 2 | 0 | 2 | 2.04 |
| ff | 2 | 1 | 1 | |
| ff | 1 | 1 | 4 | 1.876 |
| mF | 2 | 1 | 3 | 1.695 |
| f | 2 | 2 | 0 | 1.605 |
| ff | 2 | 0 | 4 | 1.619 |
| f | 0 | 0 | 6 | 1.541 |
| f | 3 | 1 | 0 | 1.432 |
| mf | 3 | 0 | 3 | 1.358 |
| f | 2 | 0 | 6 | 1.275 |

The X-ray crystallographic data show that the thermal treatment of the starting oxides was sufficient to obtain a complete loss of identity of the starting oxides with complete conversion to pure $Rh_2TeO_6$ in a good crystalline state.

In order to measure the electrical conductivity of the obtained $Rh_2TeO_6$, the powder resulting from comminuting the porous disc was again pelletized under the same conditions used for pelletizing the $Rh_2O_3$ and $TeO_2$ mixture. The measured electrical conductivity was in the range of $10^{-4}$ (ohm·cm.)$^{-1}$. The obtained $Rh_2TeO_6$ is thus really a semiconductor and its forbidden gap, or energy gap, amounts to 0.04 ev. The terms "forbidden gap" and "energy gap" refer to the distance between the top of the valence band and the bottom of the conduction band; these terms appear, for instance in "Physics and Technology of Semiconductor Devices," by A. S. Grove, pages 91–95 and 102.

The manufacturing process for the compound of the present invention is very easy and the operative conditions are easily reproducible.

Used an an anodic operative surface in the electrolysis of sodium chloride, the new compound presents very interesting polarization properties and is very resistant to electrochemical attack under cell conditions.

On account of its properties, the compound $Rh_2TeO_6$ of the present invention is very useful for industrial applications not only as an electrode in various electrochemical processes, but also as an oxidation catalyst in organic chemistry or as a component in composite semiconductive devices.

The starting materials were obtained from Fluka, CH–9470 Buchs (Switzerland).

The trademark designation of the rhodium nitrate was Rhodium (III)-nitrat Dihydrat purissimum—83 760. The trademark designation of the $TeO_2$ was Tellurdioxid purum 99% 86 370. These materials were supplied in a purity grade designated as "purissimum" which meant for rhodium a chemical analysis in weight-percent as follows:

31.7% Rh and for the $TeO_2$ a chemical analysis in weight-percent as follows:

99% $TeO_2$

The chemical analysis of the resultant $Rh_2TeO_6$ was in weight-percent as follows: Rh: 47.8%; Te: 29.7%; and O: balance.

The X-ray crystallographic data of the table were obtained by irradiating the comminuted product with a beam of $CuK_\alpha$ radiation. The intensity designations are according to the ASTM system as follows:

| Designation in table: | ASTM (relative intensity, 100 $I/I_0$) |
|---|---|
| TF=very, very strong | 100 |
| mF=very strong | 90 |
| F=strong | 80–70 |
| m=medium | 60–50 |
| f=weak | 40–30 |
| mf=faint | 20 |
| ff=very faint | 10 |

Demonstrating the utility of the $Rh_2TeO_6$ of the present invention for carrying out the half reaction $$2Cl^- \rightarrow Cl_2 + 2e^-$$

is the following example. The comminuted product was spread on a titanium plate and subjected to a pressure of 1000 kg./cm.$^2$ at a temperature of 475° C. for 20 minutes to provide a coating of 5 grams/m.$^2$ of titanium surface. The coated side of the titanium plate was then subjected, as anode, to two different tests: the first one to measure the overvoltage for the liberation of chlorine under a given anodic current density (10 ka./m.$^2$), the second one to determine the wear or consumption of noble metal as related to the quantity of evolved chlorine. The term "overvoltage" is used herein in the same sense as it is used at pages 488–492 of "Physical Chemistry" by Walter J. Moore, Prentice-Hall Inc., second edition. In the overvoltage test, the coated plate was used as anode for the electrolysis of a brine containing 250 g. NaCl/kg. of solution, saturated with chlorine at 60° C. and at an approximate pH of 2. Under these conditions, the coated plate of this example showed an overvoltage in the range 400 mv. under an anodic current density of 10 ka./m.$^2$. In the wear test, the coated plate was used as anode in a cell wih a flowing mercury cathode for the electrolysis of a brine saturated with sodium chloride and chlorine, between 80 and 85° C., under a constant anode-cathode potential difference, the test being stopped when the current density was reduced to one half of its initial value (initial value generally was between 30 and 40 ka./m.$^2$). Under these conditions, the tested plate produced 15 tons of chlorine per square meter of active surface; the rhodium consumption lay below 200 mg. per ton of chlorine produced under an average current density of 20 ka./m.$^2$.

After the 1.60 g. of $TeO_2$ and 2.54 g. of $Rh_2O_3$ have been comminuted, the well homogenized mixture has a particle size distribution lower than 1$\mu$.

The pelletizing is carried out without any binding additive.

It will be understood that the above description of the present invention is susceptible to various modifications, changes and adaptations, and the same are intended to be comprehended within the meaning and range of equivalents of the appended claims.

What is claimed is:

1. $Rh_2TeO_6$ crystallized in the tetragonal system under the trirutile form, the parameters $a_0$ and $c_0$ being 4.54 and 9.245 A., respectively, having an electrical conductivity of $10^{-4}$ (ohm·cm.)$^{-1}$ and an energy gap of 0.04 ev.

2. $Rh_2TeO_6$ as claimed in claim 1 and having line intensities and interplanar spacings as follows:

| Intensity | Miller indices h | k | l | Interplanar spacing, d (A.), $Rh_2TeO_6$ |
|---|---|---|---|---|
| ff | 0 | 0 | 2 | ---------- |
| ff | 1 | 0 | 1 | ---------- |
| TF | 1 | 1 | 0 | 3.21 |
| F | 1 | 0 | 3 | 2.55 |
| mf | 2 | 0 | 0 | 2.27 |
| f | 1 | 1 | 3 | 2.22 |
| f | 2 | 0 | 2 | 2.04 |
| ff | 2 | 1 | 1 | ---------- |
| ff | 1 | 1 | 4 | 1.876 |
| mF | 2 | 1 | 3 | 1.695 |
| f | 2 | 2 | 0 | 1.605 |
| ff | 2 | 0 | 4 | 1.619 |
| f | 0 | 0 | 6 | 1.541 |
| f | 3 | 1 | 0 | 1.432 |
| mf | 3 | 0 | 3 | 1.358 |
| f | 2 | 0 | 6 | 1.275 |

3. A method for making $Rh_2TeO_6$ as claimed in claim 1, comprising the steps of mixing equimolecular quantities of $TeO_2$ and $Rh_2O_3$, comminuting the resulting mixture, pelletizing the result of the step of comminuting, and heating the pellets at 750° C. in an oxidizing atmosphere for a period of time sufficient to produce $Rh_2TeO_6$ as claimed in claim 1.

References Cited

UNITED STATES PATENTS

| | | | |
|---|---|---|---|
| 3,070,421 | 12/1962 | Bayer | 23—50 R |
| 3,309,168 | 3/1967 | Bayer | 23—50 R |
| 3,052,573 | 9/1962 | Dumesnil | 252—518 X |
| 3,324,049 | 6/1967 | Holmes | 252—518 X |
| 3,498,931 | 3/1970 | Rogers et al. | 252—518 |
| 3,519,402 | 7/1970 | Hulligen | 23—315 |

CHARLES E. VAN HORN, Primary Examiner

U.S. Cl. X.R.

423—508, 592